(12) United States Patent
Kokaji et al.

(10) Patent No.: US 6,533,862 B2
(45) Date of Patent: Mar. 18, 2003

(54) PASTING MACHINE FOR AN ACTIVE PASTE FOR A LEAD BATTERY

(75) Inventors: Shinichi Kokaji, Fukushima (JP); Naohiro Otake, Fukushima (JP)

(73) Assignee: The Furukawa Battery Co., Ltd., Yokohama (JP)

(*) Notice: Subject to any disclaimer, the term of this patent is extended or adjusted under 35 U.S.C. 154(b) by 0 days.

(21) Appl. No.: 09/898,045

(22) Filed: Jul. 5, 2001

(65) Prior Publication Data

US 2002/0005162 A1 Jan. 17, 2002

(30) Foreign Application Priority Data

Jul. 13, 2000 (JP) .......................... 2000-213022

(51) Int. Cl.$^7$ ................................ B05C 5/02
(52) U.S. Cl. .................. 118/407; 118/410; 118/419
(58) Field of Search ................. 118/407, 410, 118/419; 427/58, 123, 356

(56) References Cited

U.S. PATENT DOCUMENTS 4,606,383 A * 8/1986 Yanik .......................... 141/1.1
4,932,443 A * 6/1990 Karolek et al. ............... 141/1.1

FOREIGN PATENT DOCUMENTS

JP 3-89460 4/1991
JP 9-245776 * 9/1997

* cited by examiner

*Primary Examiner*—Laura Edwards
(74) *Attorney, Agent, or Firm*—Armstrong, Westerman & Hattori, LLP

(57) ABSTRACT

A pasting machine is provided for paste of an active material for a lead battery which is capable of continuously applying stably and favorably, not only a paste of active material for a negative electrode, but also a paste of active material for a positive electrode, to a continuous substrate. There is arranged within a hopper 1 a pair of front and rear paddles 2,2 located above, a delivery roller 3 located below, a vaned roller 5' located at a rear side of the intermediate portion, and an auxiliary roller 4 located diagonally to the upper front of the delivery roller 3 spaced from and opposed to the delivery roller 3. A delivery opening 6$a$ of an orifice plate 61 fixed to the lower end of the hopper 1 is made open to direct paste in the same direction as the travel direction of a continuous, substrate A.

4 Claims, 2 Drawing Sheets

PASTING MACHINE FOR AN ACTIVE PASTE FOR A LEAD BATTERY

BACKGROUND OF THE INVENTION

1. Field of the Invention

The present invention relates to a pasting machine of an orifice type for continuously applying an active paste to a continuous substrate for use in continuously producing pasted electrode plates for a lead battery.

2. Description of Related Art

In producing continuously pasted electrode plates to be used for a lead battery, such as by continuously applying an active paste onto a continuously cast substrate, for instance, there has been publicly known a pasting machine having an orifice type hopper for applying a negative paste to the continuous cast substrate so as to extend the paste over both surfaces of the continuous substrate. One example thereof is shown in FIG. 2. Namely, in FIG. 2, 1 designates a hopper. There is arranged within the hopper 1 a pair of front and rear paddles 2,2 located at the upper portion of the interior of the hopper, a delivery roller 3 located at the lower portion thereof, and an auxiliary roller 4 located diagonally to the upper front portion of the delivery roller 3 with a space S therebetween. A saw-toothed roller 5 serves as a feed roller, located at the rear side of the intermediate portion thereof, for feeding an active paste towards the space S formed between the mutually opposite auxiliary roller 4 and the delivery roller 3. Also it is so arranged that there is a space S' between the delivery roller 3 and a curved inner surface of the front wall of the hopper 1 that is in opposition to the delivery roller 3, for communicating between the foregoing space S and an orifice delivery opening 6a of an orifice plate 6 fixed to a lower end of the hopper 1. The delivery opening 6a opens toward the same direction as the direction in which a continuously cast substrate A travels, as shown by an arrow, by a belt conveyor 7 running from the front of the hopper 1 towards the rear thereof, in other words, in the rear direction, as shown by an arrow.

When a comparatively soft paste of active material, of which penetration is about 30~50, is pasted or applied continuously to the continuous cast substrate A using the foregoing pasting machine, a delivery amount of active paste from the delivery opening 6a is sufficient. However, if a comparatively hard paste of active material of which penetration is about 20~30 is pasted or applied continuously thereto to using this machine, the delivery amount of the paste from the delivery opening is liable to become insufficient, so that a dispersion in the bulk density results, and it is difficult to uniformly paste or apply to a continuous substrate stable and favorably, so that stable and good positive electrode plates can not be produced.

Here, the penetration of active paste was measured, by using a penetrometer, such as a glove penetrometer or the like, in such a manner, for instance, that the point of a needle weighing 70 g, held vertically by a holding machine, is placed on the top surface of a piled paste to be measured and the needle is then released to penetrate into the paste, and the penetration distance or depth of the needle was measured. When the distance of penetration is 0.1 mm, the value thereof is expressed as 1. Therefore, the foregoing penetration value 20~30 means 2.0~3.0 mm and the penetration value 30~50 means 3.0~5.0 mm.

SUMMARY OF THE INVENTION

The present invention is to solve the problems for the foregoing prior art and provide a pasting machine which is capable of continuously pasting or applying stably and satisfactorily not only a soft paste of active material, but also a hard paste of active material onto the continuous cast substrate, wherein there is arranged within a hopper a pair of front and rear rotatable paddles located at the upper portion of the interior of the hopper, a delivery roller located at the lower portion thereof, and an auxiliary roller located diagonally to the upper front portion of the delivery roller with a space therebetween. A feed roller is located at the rear side of the intermediate portion of the hopper for feeding active paste towards the space formed between the mutually opposite auxiliary roller and the delivery roller, and an orifice plate, which is fixed to the lower end of the hopper, has an orifice delivery opening, opening in the same direction as the direction in which a continuous cast substrate travels. The improvement includes use of a vaned roller-having 2 to 3 vanes as the feed roller. Further, the present invention is characterized in that, in the above-mentioned paste machine according to the present invention, the width of the orifice delivery opening is in the range of 1.4~1.7 times the width of a space between the inner face of the front wall of the hopper and the delivery roller.

By using the vaned roller as the feed roller, the forwardly feeding pushing force exerted on the paste within the hopper towards the space between the auxiliary roller and the delivery roller is increased and the comparatively soft paste of active material, and even the comparatively hard paste of active material also can be pasted or applied stably and favorably continuously to the continuous cast substrate. By limiting the width of the delivery opening to the range of 1.4~1.7 of that of the width of the space between an inner face of the front wall of the hopper and the delivery roller, the pasting speed of comparatively hard paste of active material can be accelerated.

DESCRIPTION OF THE PREFERRED EMBODIMENT

Figure 1:
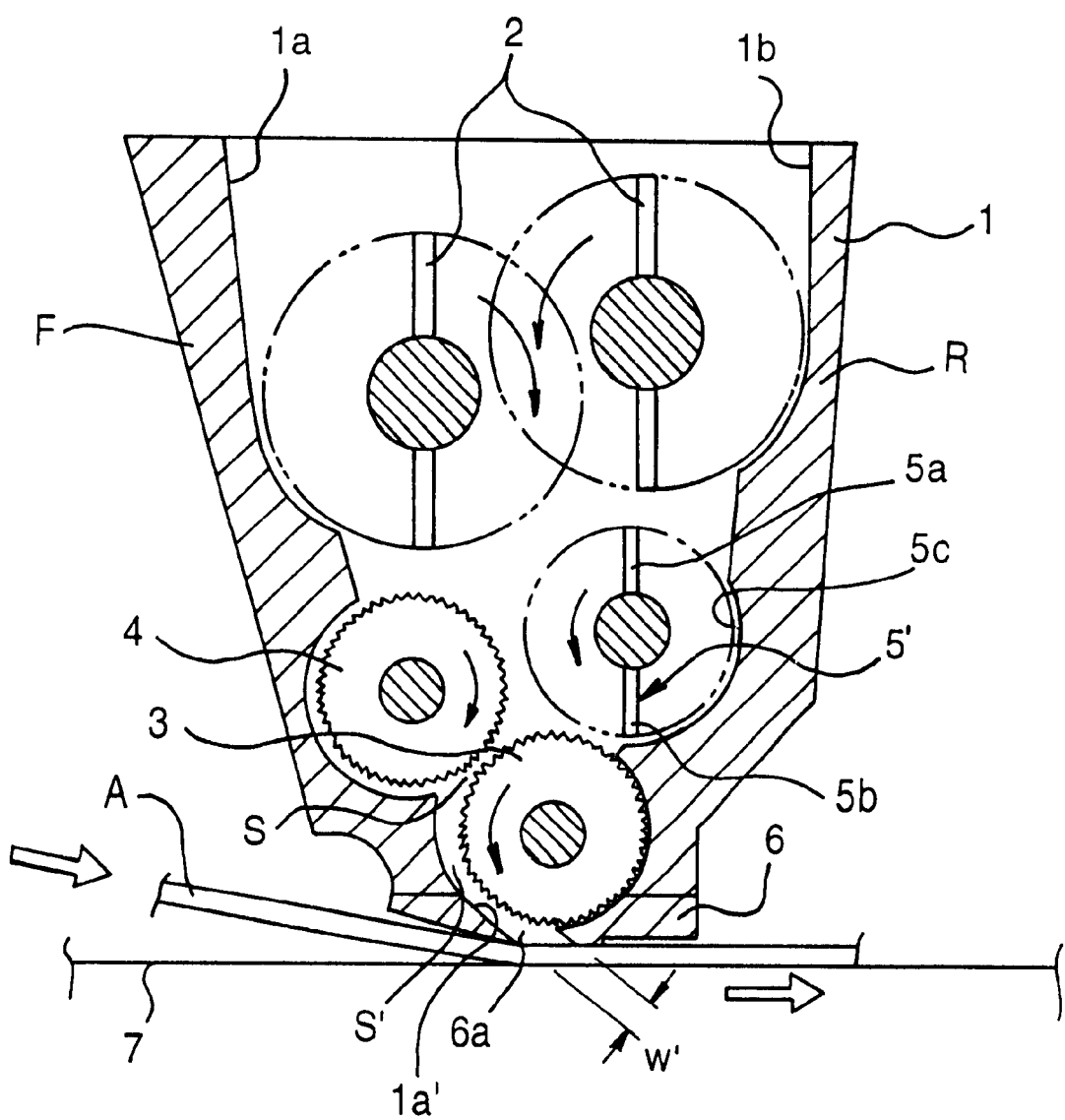
FIG. 1 is a sectional view of a pasting machine of the present invention for providing an active paste for a lead battery vertically cut in the longitudinal direction.

One mode of the embodiment of the present invention will be described with reference to FIG. 1, wherein the same components of the pasting machine according to the invention as the components of the foregoing conventional pasting machine are designated by the same reference characters. Reference numeral 1 denotes a hopper, 2,2 denote a pair of front and rear rotatable paddles located in an upper portion of the interior of the hopper, 3 denotes a delivery roller which is located at the lower portion thereof and whose periphery has numerous parallel notched grooves formed therein, and 4 denotes an auxiliary roller on which the periphery has numerous notched parallel grooves formed therein and which is located diagonally to the upper front of the delivery roller 3 to leave a space S between the auxiliary roller 4 and the delivery roller 3.

According to the present invention, a rotatable vaned roller 5' is located at an intermediate portion of the interior of the hopper and behind the auxiliary roller 4, in place of the conventional saw-toothed feed roller, as a feed roller for feeding active paste towards the space S formed between the above-mentioned mutually opposite auxiliary roller 4 and the delivery roller 3. The vaned roller 5', for instance, has two vanes 5a and 5b which are keyed to a rotary shaft with intervals of a rotation angle of 180°, that is, on mutually opposite sides of the shaft. As for the continuous substrate A, besides a load grid substrate, a non-cast substrate, such as a punched substrate, may be used. And, as shown in FIG. 1, it is preferable to form the inner face of the rear wall R of the hopper 1 to have an arcuate recess 5c in close vicinity to the rotation locus of the vanes, so that no substantial gap results therebetween in which active paste might be stagnated between the vanes of the vaned roller 5' and the opposite inner face of the rear wall R of the hopper 1.

Figure 2:
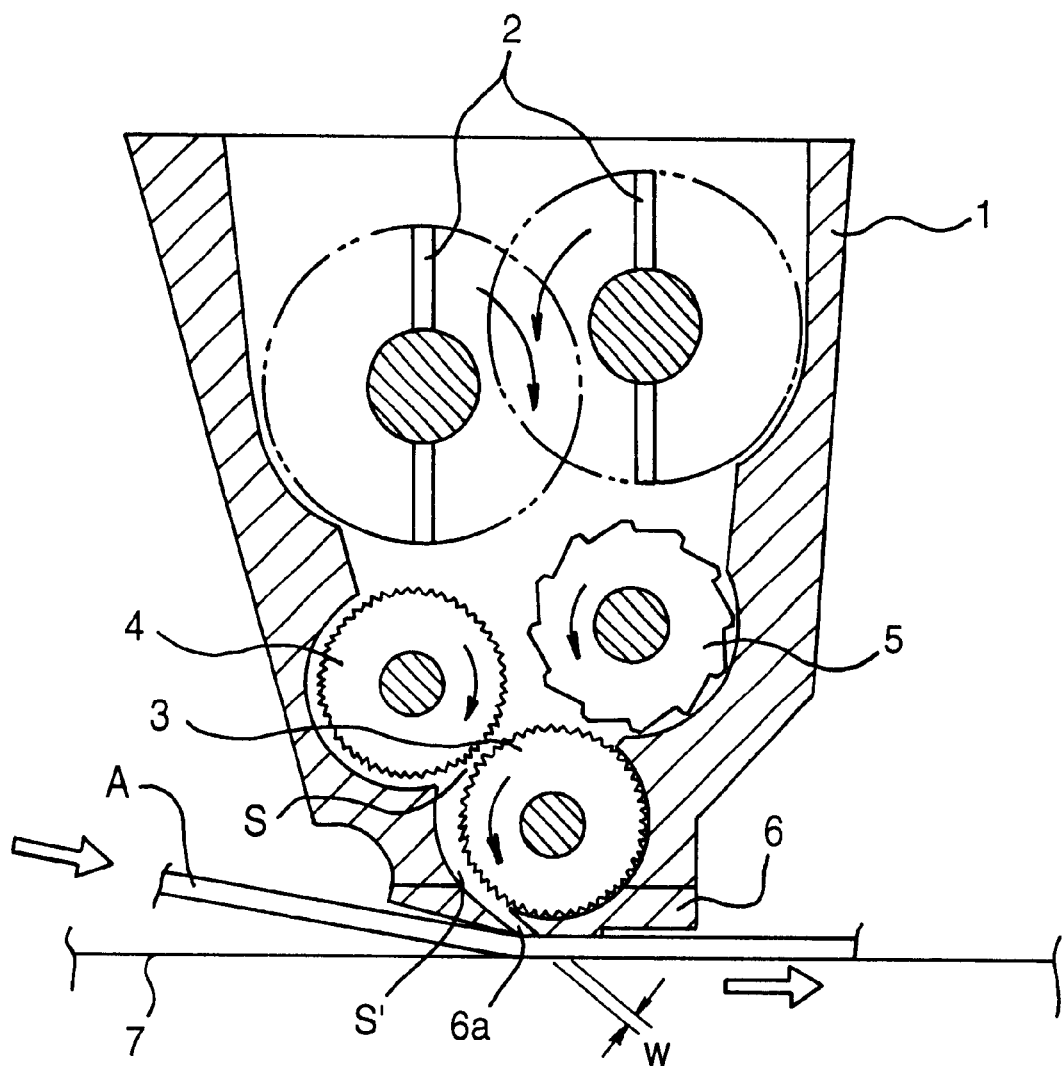
FIG. 2 is a sectional view of a conventional pasting machine for applying a negative paste for a lead battery vertically cut in the longitudinal direction.

Further, the pair of the front and rear paddles 2,2 are so arranged that the respective rotation loci of the vanes thereof may be overlapped one with another at the middle between them, and also the inner face 1a of the front wall F and the inner face 1b of the rear wall R of the hopper 1, which face the front and rear paddles respectively, have arcuate recesses close to and along the respective rotation loci thereof so that the active paste may not be stagnated between the front paddle and the opposite inner face 1a of the front wall F and between the rear paddle and the opposite inner face 1b of the rear wall R. Similarly, recesses in the hopper walls are provided, so that there will be no stagnation of the active paste between the auxiliary roller 4 and the opposite inner face 1a of the front wall F of the hopper 1 and between the delivery roller 3 and the opposite inner face 1b of the rear wall R of the hopper 1. The above arrangements are not different from those of the conventional machine as shown in FIG. 2. Also, as is the conventional machine, an orifice plate 6 is fixedly provided on the lower end of the hopper 1 and has a delivery opening 6a in the form of a rectangular slot which extends laterally over the entire width of the continuous substrate A traveling below and along the same. Furthermore, as with the conventional device, a space S' is formed between the delivery roller 3 and the curved inner face 1a of the front wall F of the hopper 1 which faces the delivery roller 3 with the same width of the space S' of the conventional machine.

The operation of the foregoing machine according to the present invention is as follows. When the pair of the front and rear paddles 2,2, the vaned roller 5' having two vanes 5a and 5b, the auxiliary roller 4 and the delivery roller 3 are being rotated in the directions of respective arrows shown in FIG. 1, and a comparatively hard paste of active material, used for a positive electrode for a lead battery, that is 20~30 in penetration, was charged into the hopper 1, and the charged active paste was first stirred and fed downwards by the pair of front and rear paddles 2,2 located above, and the downwardly fed active paste was then pushed and fed by the strong force of the vanes 5a and 5b of the vaned roller 5', located below the pair of paddles and at the rear side of the intermediate portion in the hopper 1, the paste was passed towards the space S between the auxiliary roller 4 and the delivery roller 3 which are located diagonally to the front lower side of the vaned roller 5'. The paste was then pushed to pass through the space S' between the delivery roller 3 and the curved inner face 1a' of the front wall F of the hopper 1 and was fed into the delivery opening 6a, and was then pushed out to be applied stably and favorably to the continuous cast lead grid substrate A which is continuously being moved beneath the delivery opening 6a by the belt conveyor 7 as shown by the arrow. Further, when a soft paste of active material, used for a negative electrode for a lead battery, that is 30~50 in penetration was charged into the hopper 1, and the same pasting operation as mentioned above was carried out, the pasting or application speed, in other words, the travel speed of the continuous substrate A can be increased as compared with the case of using the conventional machine shown in FIG. 2, and in addition, there can be obtained a uniformly pasted or filled good continuous substrate pasted stably and favorably without dispersion of the bulk density.

Furthermore, comparative tests were carried out using not only the foregoing vaned roller 5' having two vanes, but also, though not shown, a vaned roller having 3 vanes and a vaned roller having 4 vanes, and the respective application of active paste applied to the respective continuous cast substrates were observed. As a result, it has been found that the dispersion of the applied amount of the active paste when using the vaned roller 5' having two vanes as shown was about ±2% and the dispersion of the pasted amount thereof in the case of using the vaned roller having three vanes fixed to its rotary shaft with intervals of rotation angle of 120° was about ±3%. In contrast therewith, in the case of using the vaned roller having four vanes fixed to its rotary shaft with intervals of rotation angle of 90°, the pasting was discontinuous or intermittent. As a result, it has been concluded that the vaned roller provided with two vanes or three vanes as mentioned above are preferably used. Furthermore, it has been confirmed that when the continuous pasting of the foregoing comparatively soft paste of negative material, used for a negative electrode, was carried out by using the pasting machine provided with the vaned roller provided with two vanes or three vanes according to the present invention, even when the pasting speed, in other words, the travel speed of the continuous substrate A was increased, the continuous pasting or applying of paste onto the continuous substrate can be achieved stably and satisfactorily. According to the present invention, a vaned roller 5' with two or three vanes on a paddle may be used.

For the purpose of increasing the pasting speed for the comparatively hard paste of active material for a positive electrode, the pasting machine provided with the vaned roller having two or three vanes according to the present invention were studied, by enlarging the width of the delivery opening 6a to 1.4~1.7 times larger than that of the space S'. More specifically, in the conventional pasting machine shown in FIG. 2, the delivery opening 6a of the orifice plate 6 is so formed as to be aligned with and extended from the lower end edge of the curved inner face of the front hopper 1 and is communicated with the space S' required for paste delivery formed between the peripheral surface of the delivery roller 3 and the inner face thereof curved there along. The delivery opening 6a of the orifice plate 6 on the outlet side of the passage through which the pasted continuous substrate is to be discharged continuously is so formed that it may extend obliquely downwards in the same direction as the discharging or travelling direction of the continuous substrate A and that the width W thereof may have substantially the same width of the space S'. In order to improve the above-mentioned construction of the conventional pasting machine, by way of experiment, various orifice plates were made of which the delivery openings were varied in width by widening the size of the delivery opening 6a of the delivery plate 6, by cutting the same, and the pasting operation of the pasting machines respectively provided with the various orifice plates 6 of which the respective delivery opening 6a are wider than the width of the space S' between the delivery roller 3 and the curved inner face of the front wall of the hopper 1 were carried out. As a result, it has been found that, if the width W' of the delivery opening 6a is from 1.4 times to 1.7 times the width of the space S', the pasting speed of the comparatively hard active paste can be increased, but if the width W' is 2.0 times the space S', the dispersion of the pasting is increased, while if it is 1.2 times, there is obtained no effect by such widening and there is no clear difference from the case of the width W of the conventional machine.

FIG. 1 shows one example of the pasting machine according to the present application in which the width W' of the delivery opening 6a of the orifice plate 6 is within the range of 1.4 to 1.7 times the width of the space S' between the delivery roller 3 and the curved inner face of the front wall of the hopper 1.

Furthermore, also when using the vaned roller 5' where the number of the vanes is three, if the width W' of the delivery roller 6a is widened to the range as defined above, the pasting speed was increased.

Thus, the pasting machine according to the present invention is one in which there is used a rotatable vaned roller with two or three vanes as a feed roller, located at the intermediate portion of the interior of the hopper, so that even the comparatively hard active paste can be pasted or applied stably and favorably to the continuous substrate. In an embodiment, the width of the delivery opening is widened to 1.4~1.7 times the space between the inner face of the front wall of the hopper and the delivery roller, so that the pasting speed can be increased.

What is claimed is:

1. A pasting machine for an active paste for a lead battery comprising a hopper, a pair of front and rear rotatable paddles located within the hopper and at the upper portion thereof a single delivery roller located at the lower portion of the hopper, an auxiliary roller located diagonally to an upper front portion of the single delivery roller spaced from and opposed to the single delivery roller, a rotatable feed roller located at a rear side of an intermediate portion of the hopper for feeding active paste towards a space formed between the auxiliary roller and the single delivery roller, and an orifice plate which is fixed to a lower end of the hopper and having an orifice delivery opening therein discharging in a direction the same as a direction in which a continuous substrate is to be traveled, wherein the rotatable feed roller consists of a vaned roller having 2 to 3 vanes.

2. A paste machine for active paste for a lead battery according to claim 1, wherein a width of the orifice delivery opening in the direction of travel of the continuous substrate is in the range of 1.4~1.7 times the width of a space between an inner face of the front wall of the hopper and the single delivery roller.

3. A pasting machine for an active paste for a lead battery comprising a hopper, a pair of front and rear rotatable paddles located within the hopper and at the upper portion thereof a single delivery roller located at the lower portion of the hopper, an auxiliary roller located diagonally to an upper front portion of the single delivery roller spaced from and opposed to the single delivery roller, a rotatable feed roller located at a rear side of an intermediate portion of the hopper for feeding active paste towards a space formed between the auxiliary roller and the single delivery roller, and an orifice plate which is fixed to a lower end of the hopper and having an orifice delivery opening therein discharging in a direction the same as a direction in which a continuous substrate is to be traveled, wherein the rotatable feed roller consists of a vaned roller having 2 vanes, and a width of the orifice delivery opening in the direction of travel of the continuous substrate is in the range of 1.4~1.7 times the width of a space between an inner face of the front wall of the hopper and the single delivery roller.

4. A pasting machine for an active paste for a lead battery comprising a hopper, a pair of front and rear rotatable paddles located within the hopper and at the upper portion thereof, a single delivery roller located at the lower portion of the hopper, an auxiliary roller located diagonally to an upper front portion of the single delivery roller spaced from and opposed to the single delivery roller, a rotatable feed roller located at a rear side of an intermediate portion of the hopper for feeding active paste towards a space formed between the auxiliary roller and the single delivery roller, and an orifice plate which is fixed to a lower end of the hopper and having an orifice delivery opening therein discharging in a direction the same as a direction in which a continuous substrate is to be traveled, wherein the rotatable feed roller consists of a vaned roller having 3 vanes, and a width of the orifice delivery opening in the direction of travel of the continuous substrate is in the range of 1.4~1.7 times the width of a space between an inner face of the front wall of the hopper and the single delivery roller.

* * * * *